United States Patent [19]
Talmadge

[11] Patent Number: 4,759,282
[45] Date of Patent: Jul. 26, 1988

[54] APPARATUS FOR SUPPORTING AND CONVEYING IRREGULARLY-SHAPED WORKPIECES

[75] Inventor: Paul C. Talmadge, Ansonia, Conn.

[73] Assignee: Pitney Bowes Inc., Stamford, Conn.

[21] Appl. No.: 76,823

[22] Filed: Jul. 23, 1987

[51] Int. Cl.$^4$ .............................................. B41F 17/00
[52] U.S. Cl. .................................. 101/35; 101/407 BP; 198/715; 198/803.14
[58] Field of Search ................ 101/35, 41, 44, 407 BP; 198/715, 803.14

[56] References Cited

U.S. PATENT DOCUMENTS

| | | |
|---|---|---|
| 3,587,455 | 6/1971 | Childress .............................. 101/35 |
| 3,961,701 | 6/1976 | Paddock et al. ............ 198/803.14 X |
| 3,983,287 | 9/1976 | Goossen et al. . |
| 4,172,671 | 10/1979 | Stenndd . |
| 4,184,780 | 1/1980 | Kurihara et al. . |
| 4,227,819 | 10/1980 | Manriquez . |
| 4,263,845 | 4/1981 | Okamura ....................... 101/426 X |
| 4,307,661 | 12/1981 | Wilkens et al. . |
| 4,388,866 | 6/1983 | Nakanishi ....................... 101/35 X |
| 4,427,250 | 1/1984 | Hines et al. . |
| 4,597,330 | 7/1986 | Hill et al. . |
| 4,620,807 | 11/1986 | Polit . |

FOREIGN PATENT DOCUMENTS 8602293 12/1986 Netherlands ........................ 198/715

*Primary Examiner*—Clifford D. Crowder
*Attorney, Agent, or Firm*—Donald P. Walker; David E. Pitchenik; Melvin J. Scolnick

[57] ABSTRACT

Apparatus for processing a workpiece having a flexible upper wall. The apparatus includes a vacuum plenum having a bottom wall provided with a multiplicity of apertures. In addition, the apparatus includes workpiece feeding apparatus. The feeding apparatus includes container structure including an evacuatable enclosure made of a flexible air-impermeable material rendering the enclosure contractable upon evacuation. The enclosure has a top wall dimensioned for receiving thereon a workpiece. And the feeding apparatus includes structure for moving the container structure in a predetermined path of travel relative to the bottom wall of the plenum. The workpiece processing apparatus also includes instrumentalities for initially evacuating the plenum to cause atmospheric pressure to urge the top wall of the enclosure and an upper wall of a workpiece received on the top wall into engagement with the bottom wall of the plenum, whereby the top and upper walls are flattened against the bottom wall, and then evacuating to the enclosure to cause the remainder of the enclosure to contract towards the plenum and rigidify in the form of a workpiece supporting casting.

33 Claims, 2 Drawing Sheets

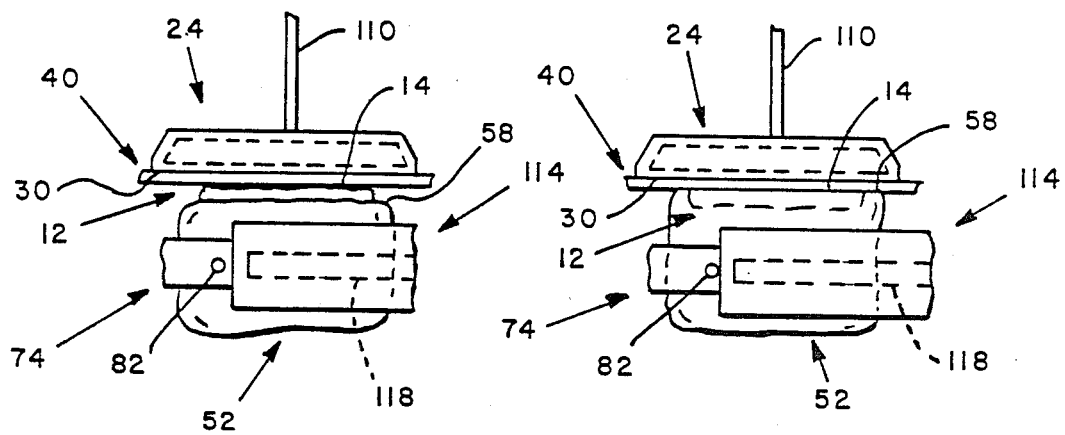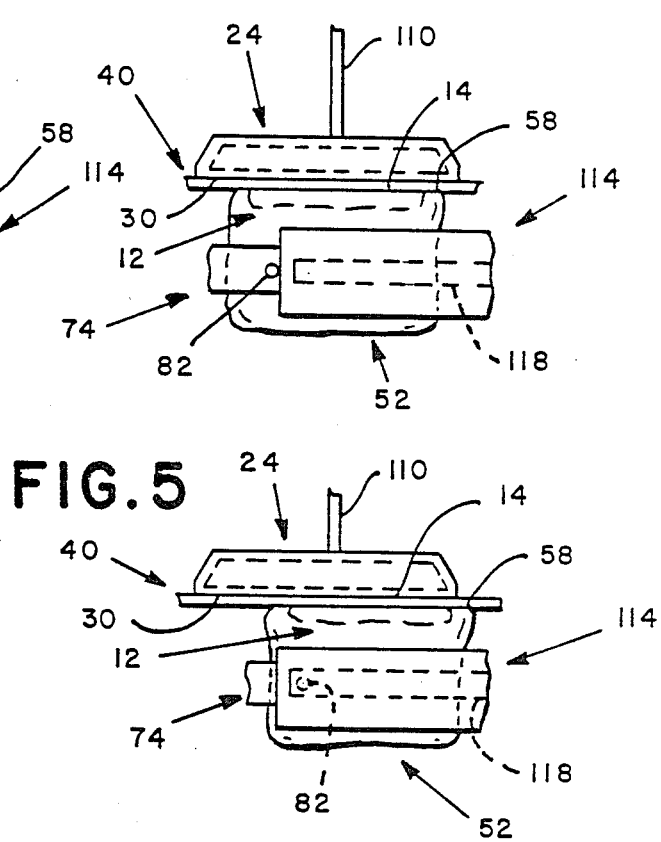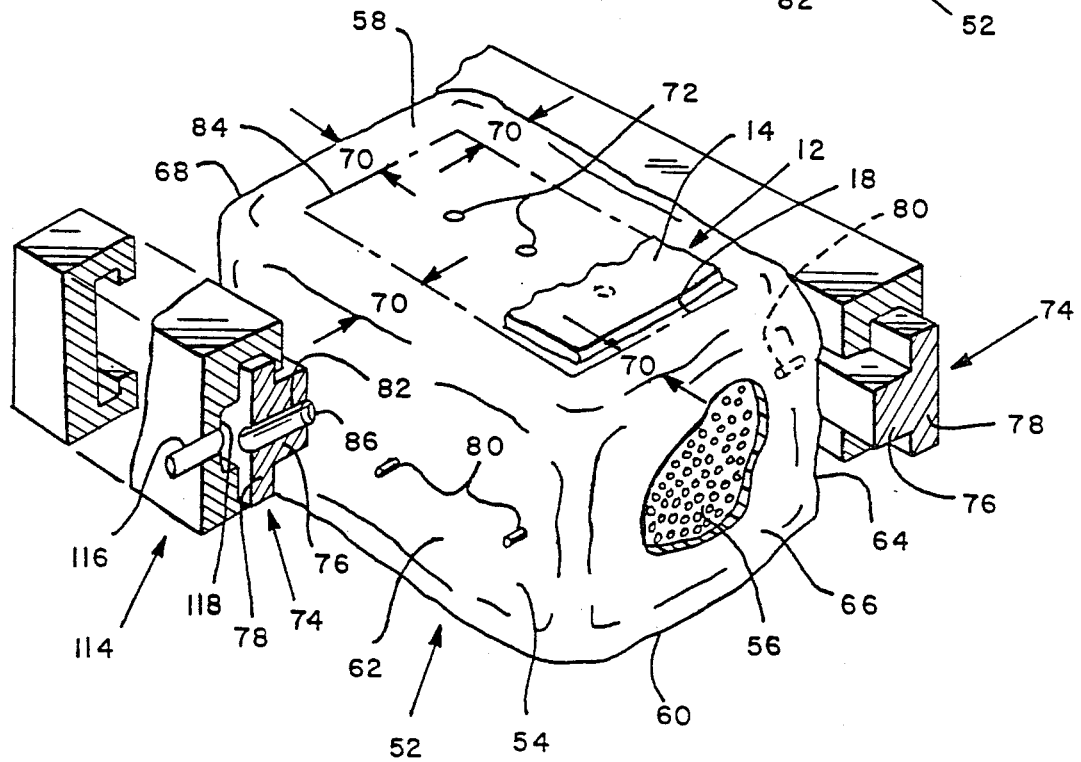

APPARATUS FOR SUPPORTING AND CONVEYING IRREGULARLY-SHAPED WORKPIECES

BACKGROUND OF THE INVENTION

This invention is generally concerned with apparatus for processing workpieces and more particularly with apparatus for automatically processing irregularly-shaped workpieces, such as letters, parcels and the like.

A significant proportion of the approximately onehalf billion irregularly-shaped letters, flats, parcels, and other irregularly-shaped mailpieces, such as hotel keys, bagged film and the like, which are annually received by the U.S. Postal Service (USPS) for processing, must be manually processed due to the unavailability of automated equipment. Although such mailpieces may in most instances be automatically separated from the main stream of incoming mail, there has been a long felt need for reliable machinery for handling other processing tasks. In this connection, it is noted that manual processing is heavily relied upon for performing such functions as cancelling the postage of such mailpieces, sorting them in accordance with destination addresses or zip codes, and marking them with appropriate destination bar codes for subsequent sorting. In general, the inspection, sorting and marking functions implemented in the course of processing such mailpieces rank amongst the highest labor intensive activities engaged in by Postal Services on a worldwide basis.

Of course, large private mailers and shippers of irregularly-shaped mailpieces and parcels are similarly burdened with such labor intensive processing activities, including applying addresses and postage to mailpieces and parcels of different sizes and shapes, for delivery to the USPS and private carriers.

Accordingly:

An object of the invention is to provide apparatus for processing an irregularly-shaped workpiece; and Another object is to provide apparatus for automatically processing irregularly-shaped workpieces for inspection, sorting and marking purposes.

SUMMARY OF THE INVENTION

Apparatus for processing a workpiece having a flexible upper wall, the apparatus comprising: a vacuum plenum including a bottom wall having a multiplicity of apertures formed therein; workpiece feeding means including container means, the container means including an evacuatable enclosure made of a flexible air-impermeable material rendering the enclosure contractable upon evacuation thereof, the enclosure having a top wall dimensioned for receiving thereon a workpiece, the feeding means including means for moving the container means in a predetermined path of travel relative to the bottom wall of the plenum; and evacuating means including means for (a) initially evacuating the plenum to cause atmospheric pressure to urge the top wall of the enclosure and an upper wall of a workpiece received thereon into engagement with the bottom wall of the plenum, whereby said top and upper walls are flattened against said bottom wall, and (b) then evacuating the enclosure to cause the remainder of the enclosure to contract towards the plenum and rigidify in the form of a workpiece supporting casting.

BRIEF DESCRIPTION OF THE DRAWINGS

FIG. 2 is a partially schematic perspective view showing the container structure according to the invention, including an evacuatable enclosure partially filled with a particulate material;

FIG. 3 is a schematic view of the container structure of FIG. 2, disposed beneath an apertured belt engaging a vacuum plenum, according to the invention;

FIG. 4 is a schematic view showing the structure of FIG. 3 with the plenum evacuated, resulting in the enclosure of FIG. 3 being urged into engagement with the belt.

FIG. 5 is a schematic view showing the structure of FIG. 4 with the enclosure evacuated, after evacuating the plenum, resulting in the enclosure contracting towards the belt and rigidifying in accordance with the invention.

DESCRIPTION OF THE PREFERRED EMBODIMENTS

Figure 1:
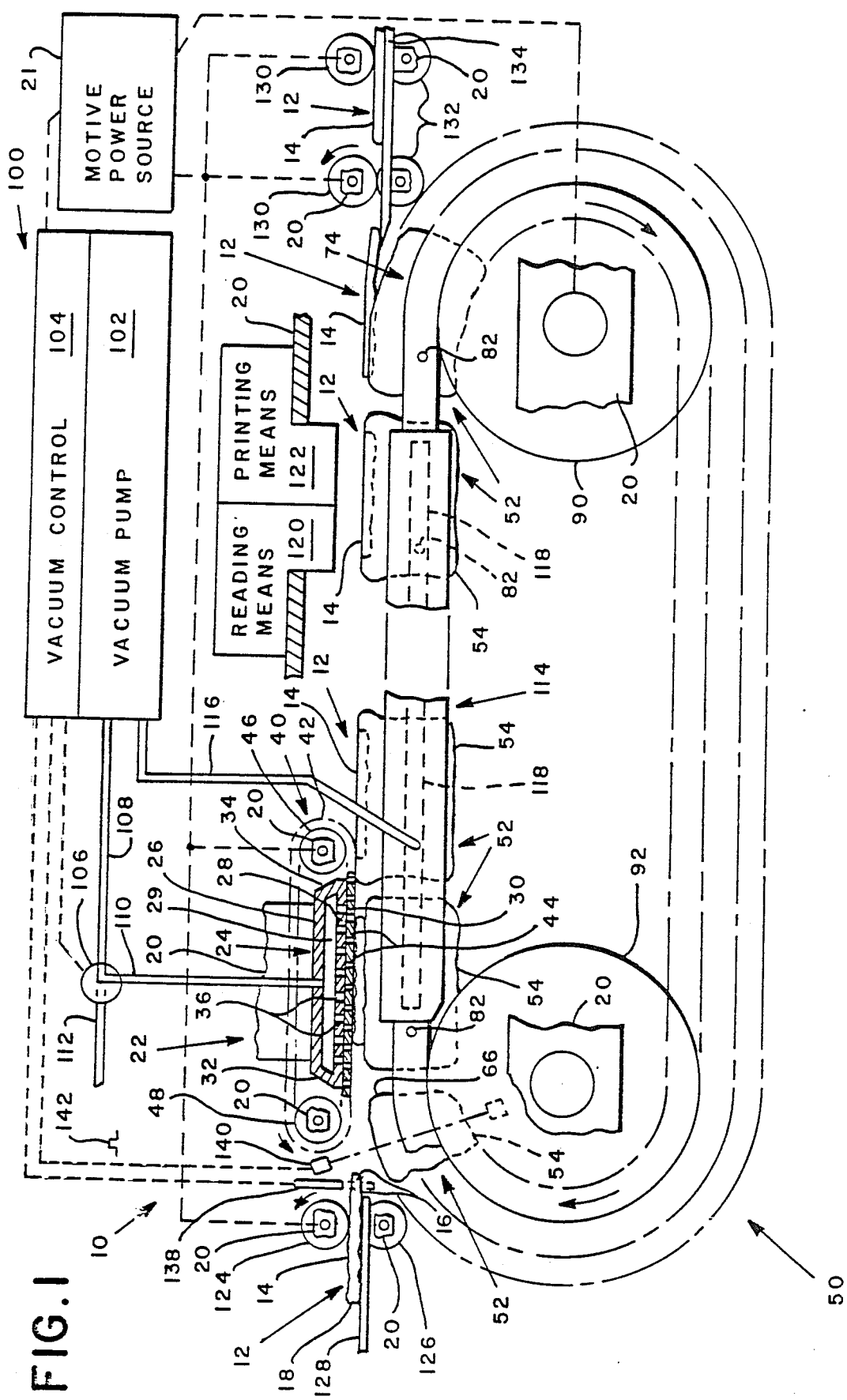
FIG. 1 is schematic view showing workpiece processing apparatus according to the invention, as used in processing an irregularly-shaped envelope.

As shown in FIG. 1 the workpiece processing apparatus 10, according to the invention, is portrayed in connection with processing an irregularly-shaped workpiece 12, which, for exemplary purposes, is shown as an irregularly-shaped envelope having a flexible upper wall 14, and having side and lower walls generally designated by the numeral 16. The upper wall 14 has a perimeter 18 which is defined by the outer extremities of the upper wall 14.

The processing apparatus 10 (FIG. 1) includes conventional framework 20 and a suitable source of supply of motive power 21. In addition, the processing apparatus 10 includes workpiece flattening structure 22. The flattening structure 22 includes a vacuum plenum 24 which is suitably fixedly connected to the framework 20. The plenum 24 has opposed top and bottom walls, numbered 26 and 28 respectively, opposed side walls 29, one of which is shown, and opposed front and rear walls, numbered 32 and 34 respectively. The bottom wall 28 has a flat, smooth, lower surface 30 and a multiplicity of apertures 36 formed therein at evenly spaced intervals throughout its length and breath. In the preferred embodiment of the invention, the flattening structure 22 also includes workpiece transporting structure 40, including a flat, smooth-surfaced, endless belt 42 having a plurality of apertures 44 formed therein at evenly spaced intervals throughout its length and breadth. For moving the belt 42, the workpiece transporting structure 40 includes oppositely spaced drive and idler rollers, numbered 46 and 48 respectively. The rollers 46 and 48, are disposed opposite the rear and front plenum walls, 34 and 32, respectively, and are conventionally rotatably connected to the framework 20. Further, the drive roller 46 is conventionally mechanically connected to the motive power source 21 for driving thereby. The belt 42 is endlessly looped about the rollers, 46 and 48, and disposed in engagement with the plenum's bottom wall 28. The relative size and positioning of the plenum and belt apertures, 36 and 44, are conventionally established to ensure that in any given position of engagement of the belt 42 with bottom wall 28 of the plenum 24, a majority of the apertures, 36 and 44, are disposed in air flow communication with each other. The remainder of the plenum apertures 36 are disposed in air flow communication with the belt structure such that upon evacuation of the plenum 24, atmospheric pressure tends to urge the belt 42 into sliding engagement with the plenum's bottom wall surface 30. Accordingly, the moving belt 42 is guided in a horizontally-extending belt run by the flat, bottom wall, surface 30, in its passage beneath the plenum 24.

The processing apparatus 10 (FIG. 1) additionally includes workpiece feeding structure 50 including container structure 52. The container structure 52 includes at least one, and preferably a plurality of evacuatable enclosures 54, each of which is preferably filled with a particulate material 56 (FIG. 2). Inasmuch as each of the enclosures 54 (FIG. 1) is structurally and functionally the same as each of the others, the following discussion applies with equal force to each of the enclosures 54.

As shown in FIG. 2, the enclosure 54 includes opposed top and bottom walls, numbered 58 and 60 respectively, opposed side walls, numbered 62 and 64 respectively, and opposed front and rear walls, numbered 66 and 68 respectively. The enclosure 54, which normally has the external configuration of a generally rectangularly-shaped solid, is made of a flexible air-impermeable material, such as plastic film or sheet rubber, or cloth impregnated or laminated with plastic or rubber, or the like, in order to render the enclosure 54 contractable upon evacuation, for agglomerating the aggregate material 56 within the enclosure 54, to cause the enclosure 54 to rigidify. The dimensions of enclosure's top wall 58 are preferably larger than the largest workpiece 12 (FIG. 1) which is to be processed by the apparatus 10. Thus, as shown in FIG. 2, wherein the outer perimeter 18 of a given workpiece 12 is shown superimposed on the enclosure top wall 58, the area of the top wall 58 is large enough to define a variably dimensioned wall margin 70 surrounding the perimeter 18 of a workpiece 12 received on the top wall 58. In addition, within the perimeter 18, the top wall 58 has at least one aperture 72 formed in the center of the top wall 58, which is covered by any workpiece 12 received centrally on the top wall 58. As thus arranged, atmospheric pressure urges a given workpiece 12 received on the top wall 58 into engagement with the top wall 58 upon evacuation of the enclosure 54.

For transporting the container structure 52 (FIG. 1) in an endless path of travel, the workpiece feeding structure 50 includes a pair of parallel-spaced, endless, transport belts 74, one of which is shown in FIG. 1. As shown in FIG. 2, each of the belts 74 is T-shaped in transverse cross-section and includes longitudinally-extending head and stem portions, numbered 76 and 78 respectively. The container structure 52 is disposed between the transport belts 74 and is conventionally secured to the respective stem portions 76 of the belts 74, as by means of a plurality of fasteners 80. Each of the fasteners 80 extends between one of the enclosure side walls, 62 and 64, and the adjacently disposed transport belt 74. One of the transport belts 74 includes a plurality of tubularly-shaped apertures 82, which are formed therein to extend through the belt 74 at equidistantly-spaced belt intervals corresponding to the distance between next adjacent enclosures 54. Each of the apertures 82 is preferably located near the rear wall 68 of the enclosure 54 with which it is associated, substantially vertically beneath the trailing edge 84 of the perimeter 18 of an average-sized workpiece 12 which is received on the enclosure's top wall 58, and is conventionally connected in air-flow communication with the interior of the enclosure 54 with which it is associated via an orifice 86 formed therein, to permit evacuation of the enclosure 54 via the orifice 86 and aperture 82. For moving the belts 74, the workpiece feeding structure 50 also includes oppositely spaced drive and idler rollers, numbered 90 and 92 respectively. The rollers 90 and 92 are conventionally rotatably connected to the framework 20. In addition, the drive roller 90 is suitably mechanically connected to the motive power source 21 for driving thereby. And the belts 74 are respectively conventionally looped about and disposed in frictional engagement with the rollers 90 and 92.

The processing apparatus 10 (FIG. 1) additionally includes a vacuum pumping system 100. The pumping system 100 includes a conventional vacuum pump 102 and suitable vacuum control structure 104. In addition, the pumping system 100 includes a two-position air valve 106, which is conventionally mechanically connected to the vacuum control structure 104 for control thereby, and suitable air lines 108, 110 and 112. The air line 108 is conventionally connected between the air valve 106 and vacuum pump 102, the air line 110 is conventionally connected between the air valve 106 and vacuum plenum 24, and the air line 112 has one end conventionally connected to the air valve 106 and the other end vented to the atmosphere. The air valve 106 has a first position, as shown by the solid lines, wherein the air lines 108 and 110 are connected in air flow communication with each other via the air valve 106 for evacuating the plenum 24. In addition, the air valve 106 has a second position, as shown by the dashed lines, wherein the air valve 106 disconnects the air line 110 from the air line 108, and connects the air line 110 in air flow communication with the air line 112, for venting the plenum 24 to the atmosphere. The vacuum system 100 additionally includes a second vacuum plenum 114 and an air line 116 conventionally interconnecting the second plenum 114 and vacuum pump 102 in air flow communication with each other for evacuating the second plenum 114.

As shown in FIGS. 1 and 2, the second vacuum plenum 114 is an elongate enclosure having a generally C-shaped transverse cross-section and includes a longitudinally extending closed-ended channel 118 formed therein. The vacuum plenum 114 is conventionally dimensioned in transverse cross-section to lengthwise accommodate receiving therewithin the transport belt 74 (FIG. 2) which is provided with apertures 82, such that the transport belt 74 is disposed in sliding engagement with the second plenum 114 and forms therewith an air-tight seal permitting evacuation of the channel 118 via the air line 116. Since the channel 118 is disposed in air flow communication with a plurality of the transport belt apertures 82 (FIG. 1) at any given time, evacuation of the channel 118 results in evacuation of each of the container enclosures 52 having their associated belt apertures 82 located in air flow communication with the channel 118. Moreover, the second vacuum plenum 114 is disposed in engagement with the transport belt 74 throughout its upper belt run. Assuming movement of the transport belt 74, the belt apertures 82 associated with each of the container structures 52, and thus the respectively associated enclosure orifices 86 (FIG. 2), are successively disposed in air flow communication with the second plenum channel 118. Thus, each of the transport belt apertures 82 and the second plenum 114 form an air valve, which is opened in response to engagement of the transport belt aperture 82 with the channel 118 of the second plenum 114, for disposing the second plenum 114 and the enclosure 54 in air flow communication with each other, and which is closed in response to disengagement of the transport belt aperture 82 from the channel 118 of the second plenum 114.

As shown in FIG. 1 the processing apparatus 10 additionally includes conventional workpiece examining structure 120, such as a scanning device for reading indicia on the upper wall 14 of a workpiece 12 carried by the container structure 52, and includes conventional workpiece treating structure 122, such as a printing or other device for marking the upper wall 14 of a workpiece 12, for example with postage or other indicia.

Further, the processing apparatus 10 (FIG. 1) includes at least one pair of input rollers 124 and 126 which are spaced apart from each other and conventionally rotatably connected to the framework 20, on opposite sides of an appropriately formed guide plate 128, for receiving therebetween a workpiece 12 fed to the guide plate 128 and feeding the workpiece 12 into the apparatus 10. To that end the input roller 124 is conventionally connected to the motive power source 21 for driving thereby. In addition, the apparatus 10 (FIG. 1) includes at least one pair of output rollers 130 and 132 which are spaced apart from each other and conventionally rotatably connected to the framework 20, on opposite sides of an appropriately formed guide plate 134, for receiving therebetween a workpiece 12 fed from the container structure 52 and feeding the workpiece 12 from the apparatus 10. To that end the output roller 130 is conventionally connected so the motive power source 21 for driving thereby.

Assuming conventional energization of the processing apparatus 10 (FIG. 1), the motive power source 21 causes the drive rollers 46, 90, 124 and 130 to commence rotation, and the vacuum pumping system 100 causes the vacuum pump 102 to evacuate the second plenum 114 and, under the control of the vacuum control structure, to timely, alternately, evacuate and vent to the atmosphere, the first plenum 24 via the air line 108, air valve 106 and air lines 110 and 112. To that end the apparatus 10 includes conventional gate structure 138, such as pivotable arm or a solenoid operated device, which is located in the path of travel of the workpieces 18 being fed to the apparatus 10. The gate structure 138 is conventionally mechanically or electrically coupled to the vacuum control structure 104 for operation thereby. In addition, the apparatus 10 includes conventional sensing structure 140, such as an optical device, for sensing the enclosure front wall 66 (FIG. 2) as the enclosure 52 (FIG. 1) is fed towards the plenum 114, and providing a signal, such as the signal 142, to the vacuum control structure 100 which is indicative that an enclosure 52 has been sensed. In addition, the vacuum control structure 100 is conventionally operable in response to the input signal 142 for timely operating the gate 138 to permit the input rollers 124 and 126 to feed a workpiece 12 at the gate 138 into engagement with the sensed enclosure 52, such that the workpiece 12 is disposed, as shown in FIG. 2, substantially centrally of the enclosure top wall 58 for transportation thereon through the apparatus 10.

Assuming a workpiece 18 is disposed in engagement with the enclosure top wall 58, as the container structure 52 is fed downstream beneath the plenum 24, the upper wall 14 of the workpiece 12 and top wall 58 of the enclosure 12 are located, as shown in FIG. 3, substantially centrally of the bottom wall 30 of the plenum 24, at which juncture the plenum 24 is evacuated via the air line 110. To that end, the vacuum control structure 104 is conventionally constructed and arranged for timely operating the air valve 106, a predetermined interval time after detection of the front wall 66 of the enclosure 52 or after operation of the gate structure 138. Accordingly, without departing from the spirit and scope of the invention, the air valve 106 may be operable, after a time delay, in response to the enclosure detection signal 142 or in response to operation of the gate structure 138. In addition, without departing from the spirit and scope of the invention, the vacuum control structure 104 may be conventionally mechanically coupled to the motive power source 21 for causing the motive power source 21 to be decoupled from the drive rollers 46, 90, 124 and 130 substantially concurrently with evacuation of the plenum 24, whereby the container structure 52 and workpiece 12 are held stationary beneath the plenum 24 just prior to evacuation of the plenum 24.

As shown in FIG. 4, with preferred embodiment, evacuation of the plenum 24 causes atmospheric pressure to urge the upper wall 14 of the workpiece 12 and the marginal edge 70 (FIG. 2) of the top wall 58 (FIG. 4) into engagement with the belt 42, whereby the upper wall 14 of the workpiece 12 and the top wall 58, i.e., in particular the wall margin 70 thereof, are flattened against the belt 42.

As shown in both FIGS. 3 and 4, prior to evacuation of the plenum 24 (FIG. 3) and just after evacuation of the plenum 24 (FIG. 4) the belt aperture 82 is not disposed in air flow communication with the second plenum channel 118. Thereafter, while the plenum 24 (FIG. 5) is evacuated, the belt aperture 82 is disposed in air flow communication with the second plenum channel 118. Thus, the enclosure 54 is evacuated after evacuation of the plenum 24, and, therefore, after the upper wall 14 of the workpiece 12 and top wall margin 70 of the enclosure 54 have been flattened against the belt 42. Thus, while evacuation of the plenum 24 is maintained, the transport belt 74 moves the container structure sufficiently to move the belt aperture 82 into air flow communication with the second plenum channel 118, whereupon the enclosure 54 is evacuated. Upon evacuation of the enclosure 54, the enclosure contracts towards the plenum 24, and thus toward flattened upper wall 14 of the workpiece 12 and flattened wall margin 70 of the enclosure 52, and rigidifies in the form of the workpiece supporting casting shown in FIG. 5, whether or not the enclosure 54 is partially filled with particulate material 56 (FIG. 2). Thereafter, plenum 24 is vented to the atmosphere via the air line 110, preferably before moving the container structure 52 away from the plenum. Accordingly, without departing from the spirit and scope of the invention, the air valve 106 may be operable for venting the plenum after a predetermined time delay, in response to the enclosure detection signal 142, or in response to operation of the gate structure 138, or in response to prior operation of the air valve 106.

As shown in FIG. 1, after movement of the cast container structure 52 from the beneath the plenum 24, the workpiece 12 is carried by the cast container structure in a path of travel extending past the workpiece examining structure 120, which, for exemplary purposes is shown as a reading device, and past the workpiece treating structure 122, which, for exemplary purposes is shown as a printing device. Due to the upper wall 14 of the workpiece 12 remaining flattened, and the workpiece being supported by the cast container structure 52, conventional optical scanning structure may be utilized for reading indicia on the flattened upper wall 14 of the workpiece 12, and conventional impact or rotary printing structure as well as ink jet or offset printing structure may be utilized for marking the flattened upper wall 14 of the workpiece 12. To that end, as shown in FIG. 1, the enclosure aperture 82 of the cast container structure 52, is maintained in air flow communication with the second plenum channel 118, as the cast container structure 52 is moved in the aforesaid path of travel beneath the examining and treating structures 120 and 122.

Thereafter, upon movement of the transport belt 74 (FIG. 1) sufficiently to move the belt aperture 82 associated with each enclosure 52 out of air flow communication with the second plenum channel 118, the enclosure 52 is vented to the atmosphere. Whereupon the workpiece is fed to the output guide plate 134 from the container structure 54 for engagement by the output rollers 130 and 132.

In an alternate embodiment of the invention, the workpiece transporting structure 40 may be excluded from the workpiece flattening structure 22, in which instance the upper wall 14 of the workpiece 12 and top wall margin 70 of the enclosure 54 would be flattened against the smooth surfaced bottom wall 30 of the plenum 24 upon evacuation of the container structure 52. In this embodiment, movement of the transport belt 74 while the plenum 24 is evacuated and the aforesaid workpiece upper wall 14 and enclosure wall margin 70 are flattened against the plenum 24 may be effectuated due to the plenum wall surface 30 being sufficiently smooth to permit substantially completely nonfrictional, sliding, engagement of the workpiece 12 and enclosure 54. In any event, it is within the spirit and scope of the invention to locate the belt apertures 82 more closely to center of the enclosure side walls 66 with which they are associated, to reduce to a minimum the time delay between completion of evacuation of the plenum 24, evacuation of enclosure 54 and then venting the plenum 24 to the atmosphere, whereby the time interval during which the plenum 24 is evacuated and the workpiece 72 and enclosure 54 are subjected to atmospheric pressure augmenting the sliding frictional engagement between the plenum 24, and workpiece 12 and enclosure 54, is reduced to a minimum.

In accordance with the objects of the invention, there has been disclosed apparatus for processing an irregularly-shaped workpiece, and more particularly, apparatus for automatically processing such workpieces for inspection, sorting and marking purposes. Moreover, such apparatus has been disclosed as being particularly useful for processing a workpiece having a flexible upper wall, such as an envelope, mailpiece, parcel, or the like, for examination and treating purposes.

The specific embodiments of the workpiece processing apparatus have been described for the purposes of illustrating the manner in which the invention may be made and used. Since the implementation of other variations and modifications of the invention will be apparent to those skilled in the art, the invention is not limited by the specific embodiments described. Accordingly, the following claims should be interpreted to cover the subject matter set forth therein and any equivalents of the invention that fall within the true spirit and scope of the invention.

What is claimed is:

1. Apparatus for processing a workpiece having a flexible upper wall, the apparatus comprising:
    (a) a vacuum plenum including a bottom wall having a multiplicity of apertures formed therein;
    (b) workpiece feeding means including container means, the container means including an evacuatable enclosure made of a flexible air-impermeable material rendering the enclosure contractable upon evacuation thereof, the enclosure having a top wall dimensioned for receiving thereon a workpiece, the feeding means including means for moving the container means in a predetermined path of travel relative to the bottom wall of the plenum; and
    (c) evacuating means including means for
        i. evacuating the plenum to cause atmospheric pressure to urge the top wall of the enclosure and an upper wall of a workpiece received thereon into engagement with the bottom wall of the plenum, whereby said top and upper walls are flattened against said bottom wall, and
        ii. then evacuating the enclosure to cause the remainder of the enclosure to contract towards the plenum and rigidify in the form of a workpiece supporting casting.

2. The apparatus according to claim 1, wherein the container means includes a particulate material partially filling the enclosure.

3. The apparatus according to claim 1, wherein the top wall of the enclosure is dimensioned such that the area of the top wall is large enough to define a wall margin surrounding the perimeter of a workpiece received on the top wall.

4. The apparatus according to claim 2, wherein evacuating the enclosure causes the particulate material to agglomerate, whereby the enclosure is rigidified.

5. The apparatus according to claim 3, wherein evacuating the plenum causes the top wall margin of the enclosure to be urged into engagement with the bottom wall of the plenum.

6. The apparatus according to claim 1, wherein prior to evacuation of the enclosure the enclosure has an external configuration of a generally rectangularly-shaped solid.

7. The apparatus according to claim 6, wherein the enclosure includes a second wall having an orifice formed therein, said orifice being disposed out of air flow communication with the evacuating means when the plenum is initially evacuated and said orifice thereafter being disposed in air flow communication with the evacuating means for evacuation of said enclosure.

8. The apparatus according to claim 1 including means for treating a flattened top wall of a workpiece.

9. The apparatus according to claim 8, wherein the treating means includes means for marking a flattened top wall of a workpiece.

10. The apparatus according to claim 8, wherein the treating means includes means for printing indicia on a flattened top wall of a workpiece.

11. The apparatus according to claim 1 including means for examining a flattened top wall of a workpiece.

12. The apparatus according to claim 1, wherein the workpiece is an irregularly-shaped mailpiece.

13. The apparatus according to claim 1, wherein the workpiece includes an irregularly-shaped envelope.

14. The apparatus according to claim 1, wherein the evacuating means includes means for venting the plenum to the atmosphere.

15. Apparatus for processing a workpiece having a flexible upper wall, wherein the workpiece has a perimeter, the apparatus comprising:
   (a) workpiece flattening means including a vacuum plenum, the plenum including a bottom wall having a multiplicity of apertures formed therein, the flattening means including a belt having a plurality of apertures formed therein, said belt disposed in engagement with the bottom wall of the plenum, the bottom wall apertures and belt apertures being disposed in air flow communication with one another, and the flattening means including means for moving the belt;
   (b) workpiece feeding means including container means, the container means including an evacuatable enclosure the enclosure made of a flexible air-impermeable material rendering the enclosure contractable upon evacuation thereof, the enclosure having a top wall for receiving thereon a workpiece, the area of the top wall being large enough to surround the perimeter of a workpiece received on the top wall, and the feeding means including means for moving the container means in a predetermined path of travel relative to the bottom wall of the plenum; and
   (c) evacuating means including means for
      i. evacuating the plenum to cause atmospheric pressure to urge the top wall of the enclosure and an upper wall of a workpiece received on the top wall into engagement with the belt whereby said top and upper walls are flattened against said belt, and
      ii. then evacuating the enclosure to cause the remainder of the enclosure to contract towards the belt.

16. The apparatus according to claim 15, wherein said container means includes a particulate material partially filling said enclosure.

17. The apparatus according to claim 15, wherein the top wall of the enclosure has a margin surrounding the perimeter of a workpiece received on said enclosure.

18. The apparatus according to claim 17, wherein said particulate material agglomerates upon evacuation of said enclosure, whereby said enclosure rigidifies to form a workpiece supporting casting.

19. The apparatus according to claim 15, wherein prior to evacuation of the enclosure the enclosure has an external configuration of a generally rectangularly-shaped solid.

20. The apparatus according to claim 19, wherein the enclosure includes a side wall having an orifice formed therein, said orifice being disposed out of air flow communication with the evacuating means when the plenum is initially evacuated and said orifice being thereafter disposed in air flow communication with the evacuating means for evacuating said enclosure.

21. The apparatus according to claim 15 including the belt being an endless belt looped about the vacuum plenum, and the belt moving means including means for endlessly moving the belt in a belt run wherein the belt is continuously disposed in engagement with the bottom wall of the plenum and wherein belt apertures are disposed in air flow communication with bottom wall apertures.

22. The apparatus according to claim 15, wherein the feeding means includes means for transporting the container means in an endless path of travel.

23. The apparatus according to claim 22, wherein the transporting means includes a pair of parallel-spaced endless transport belts, the container means disposed between the transport belts and secured thereto, and the transporting means including means for moving the transport belts and thus the container means in the path of travel.

24. The apparatus according to claim 23, wherein the container means includes a plurality of enclosures each of which is partially filled with particulate material, and each of the enclosures disposed between and secured to the respective transport belts at longitudinally-spaced intervals along the lengths of the respective transport belts, whereby the respective enclosures are movable one after the other in said path of travel.

25. The apparatus according to claim 20, wherein said feeding means includes a transport belt to which said container means is secured, said transport belt having an aperture formed therein and disposed in air flow communication with said enclosure orifice, said evacuating means including a second vacuum plenum, said belt extending adjacent to the second plenum and engaging said second plenum as said belt moves said container means in said path of travel, said second plenum and transport belt aperture forming a valve which is opened in response to engagement of said transport belt aperture with said second plenum for disposing said second plenum and enclosure in air flow communication, and said valve being closed when said transport belt aperture is disengaged from said second plenum.

26. The apparatus according to claim 15 including means for treating a flattened top wall of a workpiece.

27. The apparatus according to claim 26, wherein the treating means includes means for marking a flattened top wall of a workpiece.

28. The apparatus according to claim 26, wherein the treating means includes means for printing indicia on a flattened top wall of a workpiece.

29. The apparatus according to claim 15 including means for examining a flattened top wall of a workpiece.

30. The apparatus according to claim 15, wherein the workpiece is an irregularly-shaped mailpiece.

31. The apparatus according to claim 15, wherein the workpiece includes an irregularly-shaped envelope.

32. The apparatus according to claim 15, wherein the particulate material includes a multiplicity of uniformly dimensioned spherically-shaped beads.

33. The apparatus according to claim 15, wherein the evacuating means includes means for venting the plenum to the atmosphere.

* * * * *